US008347276B2

United States Patent
Schadow

(10) Patent No.: US 8,347,276 B2
(45) Date of Patent: Jan. 1, 2013

(54) SYSTEMS AND METHODS FOR SOFTWARE SPECIFICATION AND DESIGN USING A UNIFIED DOCUMENT

(76) Inventor: Gunther Schadow, Indianapolis, IN (US)

( * ) Notice: Subject to any disclaimer, the term of this patent is extended or adjusted under 35 U.S.C. 154(b) by 16 days.

(21) Appl. No.: 12/684,095

(22) Filed: Jan. 7, 2010

(65) Prior Publication Data
US 2011/0167409 A1 Jul. 7, 2011

(51) Int. Cl.
*G06F 9/44* (2006.01)
*G06F 9/45* (2006.01)
*G06F 17/00* (2006.01)
(52) U.S. Cl. ......... 717/137; 717/106; 717/126; 715/239
(58) Field of Classification Search .................... 717/137
See application file for complete search history.

(56) References Cited

U.S. PATENT DOCUMENTS

| | | | |
|---|---|---|---|
| 5,228,121 A | 7/1993 | Fontaine | |
| 5,408,667 A | 4/1995 | Brodie | |
| 5,892,947 A * | 4/1999 | DeLong et al. | 717/100 |
| 5,978,580 A * | 11/1999 | Wang et al. | 717/100 |
| 7,027,974 B1 * | 4/2006 | Busch et al. | 704/4 |
| 7,500,224 B2 * | 3/2009 | Hejlsberg et al. | 717/122 |
| 2002/0076112 A1 * | 6/2002 | Devara | 382/229 |
| 2003/0192009 A1 * | 10/2003 | Arcand et al. | 715/513 |
| 2003/0200098 A1 * | 10/2003 | Geipel et al. | 705/1 |
| 2004/0220815 A1 | 11/2004 | Belanger et al. | |
| 2005/0289457 A1 * | 12/2005 | Obasanjo et al. | 715/513 |

OTHER PUBLICATIONS

"ISO Schematron Validators built on the 'Skeleton'" Dec. 11, 2008, accessed online at http://web.archive.org/web/20081211073743/http://www.schematron.com/validators.html.*
Dare Obasanjo, "Improving XML Document Validation with Schematron", Sep. 2004, Microsoft Corporation, accessed online Jun. 10, 2011 at <http://msdn.microsoft.com/en-us/library/aa468554.aspx>.*

* cited by examiner

*Primary Examiner* — James D Rutten
(74) *Attorney, Agent, or Firm* — Patent Jurist; Georgiy L. Khayet

(57) ABSTRACT

A system for improving software specifications and design using a unified document, in one example embodiment, comprises a subsystem to automatically receive a formatted unified document, which can include a plurality of fragments having content formatted and labeled according to predetermined formatting and labeling criteria. The system can further include a subsystem to automatically transform the unified document into a plurality of documents including source code files. The source code files can be immediately executable or executable after being compiled into an executable code. The documents can further include test documents, installation documents, configuration documents, user documents, and edited versions of the unified document. The edited versions of the unified document can be visible by users with appropriate permissions. The formatting of the unified document can comprise assuring that each of multiple parts is formatted according to the appropriate category and selectively labeling each part. The labels can designate descriptions, outlines of data, examples, and assertion statements. The predetermined transformation rules can include transforming the descriptions into data models, transforming the examples into test cases, and transforming the assertion statements into formal assertions of an expression language.

18 Claims, 7 Drawing Sheets

SYSTEMS AND METHODS FOR SOFTWARE SPECIFICATION AND DESIGN USING A UNIFIED DOCUMENT

FIELD

This application relates generally to data processing, and more specifically to computer-implemented systems and methods for improving software specifications and design using a unified document.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

One of the greatest challenges in the software industry is translating requirements into computer code. A typical translation process requires numerous documents such as a requirements document, a specification document, multiple source code files, test plan documents, test execution report documents, system installation and end-user documents. These documents describe the software from different aspects and for different users. Before the software is created, the planned list of users of these documents may include a businessperson and an end-user. A software engineer can use these documents to create the software. A software tester can use these documents to confirm that the software functions according to the specifications. Finally, the businessperson, the end-user, and information management staff can use these documents to operate the software product.

The translation between the specification, test plan, source code, and product manuals is typically straightforward. In contrast, the translation between the requirements and the specification is often a difficult task. Moreover, it is often inevitable that once a prototype or a product is delivered to the businessperson or end user, the original requirements change as the real-world constraints become clearer, special cases are found, or opportunities for additional improvements are identified. When this happens, the requirements and the specification diverge, leading to inconsistencies in the documentation trail and to important business requirements being "lost in translation".

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In an example, a computer-implemented system for improving software specifications and design using a unified document, the system comprising a subsystem to automatically receive a formatted unified document, the unified document including a plurality of fragments, each fragment of the plurality of the fragments having a content formatted according to predetermined formatting criteria and labeled with a plurality of labels, and a subsystem to automatically transform the unified document into a plurality of documents according to predetermined transformation rules, the plurality of documents including one or more source code files.

In an example, the plurality of documents further includes one or more of the following: a test document, an installation document, a configuration document, a user document, and an edited version of the unified document, the edited version being visible to a user with permission privileges associated with the edited version. In an example, the test document includes one or more of executable test cases. In an example, the predetermined transformation rules include combining a plurality of fragments into a plurality of documents.

In an example, formatting of the unified document is performed based on the category of each of the one or more parts wherein the one or more parts are selectively labeled according to the predetermined labeling criteria to produce the plurality of the fragments having the content formatted according to the predetermined formatting criteria and labeled with the plurality of labels.

In an example, the plurality of labels includes one or more of the following: a description, an outline of data, an example, and an assertion statement. In an example, the predetermined transformation rules include one or more of the following: transforming the description into a data model; transforming the example into a test case; transforming the assertion statement into a formal assertion of an expression language.

In further examples, the above methods steps are stored on a machine-readable medium comprising instructions, which, when implemented by one or more processors, perform the steps. In yet further examples, subsystems, or devices can be adapted to perform the recited steps. Other features, examples, and embodiments are described below.

BRIEF DESCRIPTION OF DRAWINGS

Example embodiments are illustrated by way of example and not limitation in the figures of the accompanying drawings, in which like references indicate similar elements and in which.

DETAILED DESCRIPTION

Figure 1:
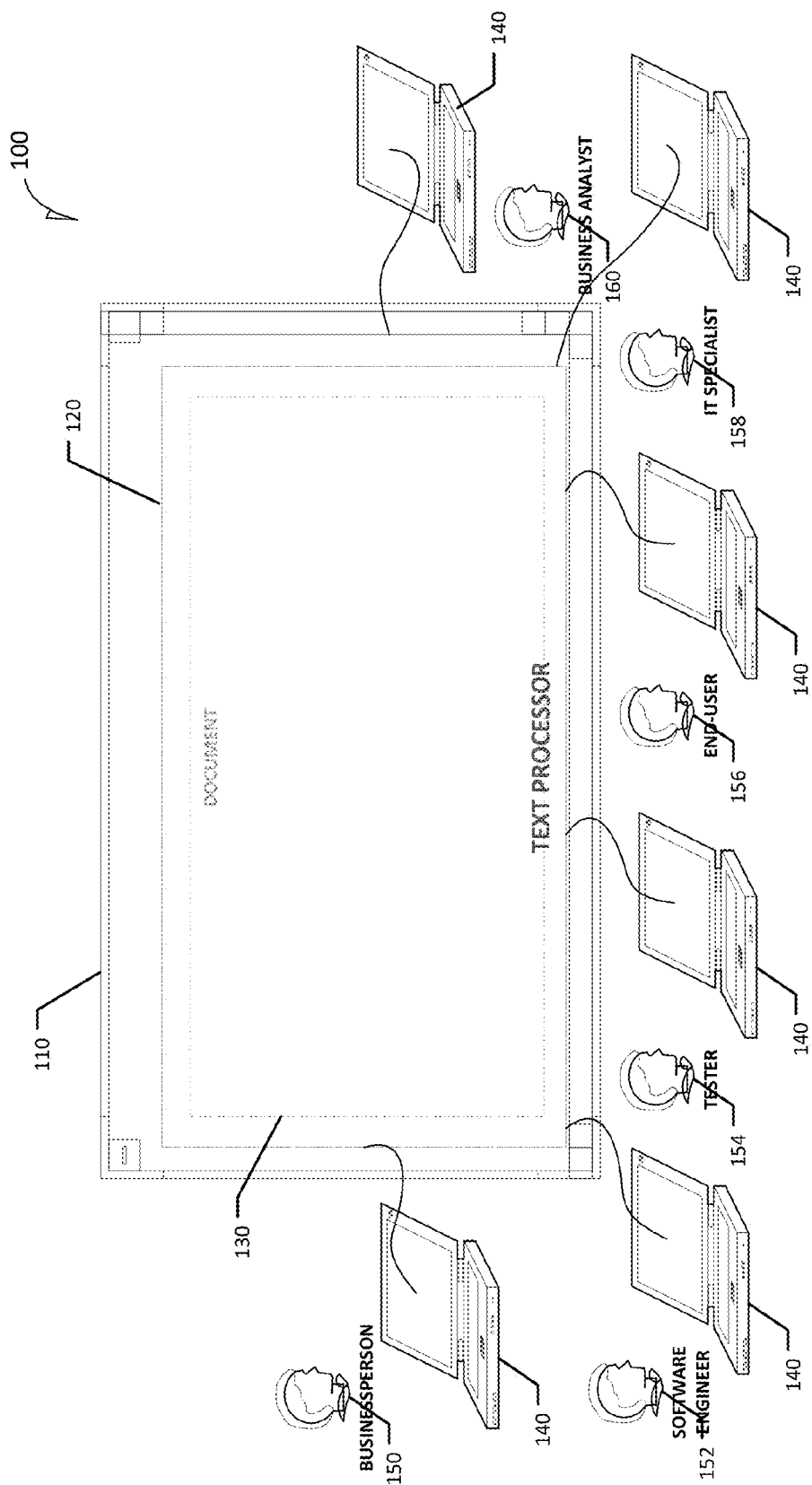
FIG. 1 is a block diagram showing a sample user environment within which systems and methods for improving software specifications and design using a unified document are implemented, in accordance with an example embodiment.

Example systems and methods for improving software specifications and design using a unified document are described. In the following description, for purposes of explanation, numerous specific details are set forth in order to provide a thorough understanding of example embodiments. It will be evident, however, to one skilled in the art, that the present invention may be practiced without these specific details.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, and other embodiments can be formed by introducing structural, logical or electrical changes without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The instant disclosure is related to systems and methods for improving software specifications and design using a unified document. In one example embodiment, a method for improving software specifications and design using a unified document can include maintaining requirements, specifications, and source code in the unified document, which can be shared among a plurality of stakeholders. The unified document can be represented by a text processor document through a computer-based application (e.g., a Microsoft Word) or a web-based application (e.g., Google Docs).

Let us take for example, a unified specification of an electronic data submission process (e.g. for electronic tax returns, electronic bill of lading, electronic hazardous material statement, electronic adverse event report, and many other government reporting or business trading and logistics transactions). Systems and methods for improving software specifications and design using a unified document can enable a business person to start a single master document (e.g., Microsoft Word) including business rule validation criteria in plain English text, and, with or without the help of a technical analyst, would include example Extensible Markup Language (XML) fragments. An engineer can now encode the business rule assertions into fragments of a formal language (e.g., XPath) right underneath the English text. Thereafter, the unified document can be processed by a machine which may inflect the English text assertions using Natural Language Processing (NLP) to change the grammar from declarative mood (e.g., "there is a social security number on the tax return") into imperative mood ("there must be a social security number on the tax return"). Such imperative forms can become the error messages generated by the business rule validation engine processing an erroneous submission. The machine can also extract and arrange the associated fragments of formal language into an executable file (e.g., Schematron) containing the query language for selecting erroneous nodes from the XML data submissions (e.g., XPath) and thus validating said submissions as has been the requirement for this example. Finally, the various parts of the document may be redacted to generate special purpose publications, such as tutorial material containing only introduction and example, validation checklists containing only the plain English assertions, test documents or any combination thereof.

The said executable file (e.g., XML file) can be processed by a declarative XML-based language (e.g., XSLT) used for the transformation of XML documents into other XML documents to make an executable validator. The validator can process a submitted document, generate a report of errors found, and show error messages in the English language. Furthermore, the validator can annotate the submitted file with error tags so that the errors can be easily found and resolved. Thus, a single document can form the source for defining requirements, used as the publication to inform the submitters of the rules with examples, and become the source for maintaining the code that actually implements these rules.

In some example embodiments, the system for improving software specifications and design using a unified document can comprise a text processor document, which combines one or more text fragments of the requirements and specification documents. A plurality of formatting styles and keywords can be utilized for labeling and differentiating the text fragments from each other. The documents are not limited to the requirements and specifications documents, and can further include the source code, test cases, user guides as well as any other documents that may be of interest to the stakeholders.

The system for improving software specifications and design using a unified document can further comprise a software utility for processing of the text fragments. The processing can include filtering, arranging, and transforming the text fragments for inclusion into the unified document. The processed fragments can be utilized within the unified document for document views, the source code, test cases or any other representations of interest to its stakeholders. Thus, the present invention can allow businesspersons and/or end-users to collaborate with engineers using the common text processor software.

The systems and methods for improving software specifications and design using a unified document can allow combination of all requirements, design, and coding artifacts in a single master-document. This master document can remain a "living document" throughout the life of the system in which one thing is stated only once and where requirements, examples, design, coding, testing, and user documentation are described together in one location. Therefore, any update in the requirement can be automatically responded to in an update of the design and coding, and any change in the design or coding can be automatically responded to with updated user documentation, reducing the difficulties of maintaining separate documents.

The systems and methods for improving software specifications and design using a unified document provide freedom to choose a presentation of the subject matter that is streamlined and business-oriented, so that the business and the engineering stakeholders do not always have to stay in lock-step. For example, an entire business-section may be devised to outline the legal framework in which the business exists without there being any specific software designs related to the description of the legal framework (although there might be such specific software designs); or, an entire section may be devised to define an object model framework which sets foundations that will be applied to the business requirements. These overarching sections may occur before or after the sections that depend on them. Thus, there need be no sequence limitation or limitation against the use of forward-references.

FIG. 1 is a block diagram showing a sample user environment 100 within which systems and methods for improving software specifications and design using a unified document can be implemented, in accordance with an example embodiment. As shown in FIG. 1, the sample user environment 100 can comprise a plurality of computers 140. Each computer can include a user interface 110. Each of the plurality of computers 140 may be capable of rendering a document 130 supported by a text processor 120 on the user interface 110. It will be understood that the plurality of computers 140 are not limited to conventional personal computers but can also include other stationary and/or portable devices capable of rendering text processor documents. Because a text processor document can be rendered remotely via a browser (e.g., Internet Explorer, Firefox, Safari, Mozilla, Chrome, and Opera), the plurality of the computers 140 do not have to necessarily support the text processor 120.

The sample user environment 100 can further include various stakeholders and users such as a businessperson 150, a software engineer 152, a tester 154, an end-user 156, an Information Technology (IT) specialist 158, an a business analyst 160. The interactions between various components of the sample user environment 110 are in more detail below with reference to FIGS. 2, 3, 4, and 5.

Figure 2:
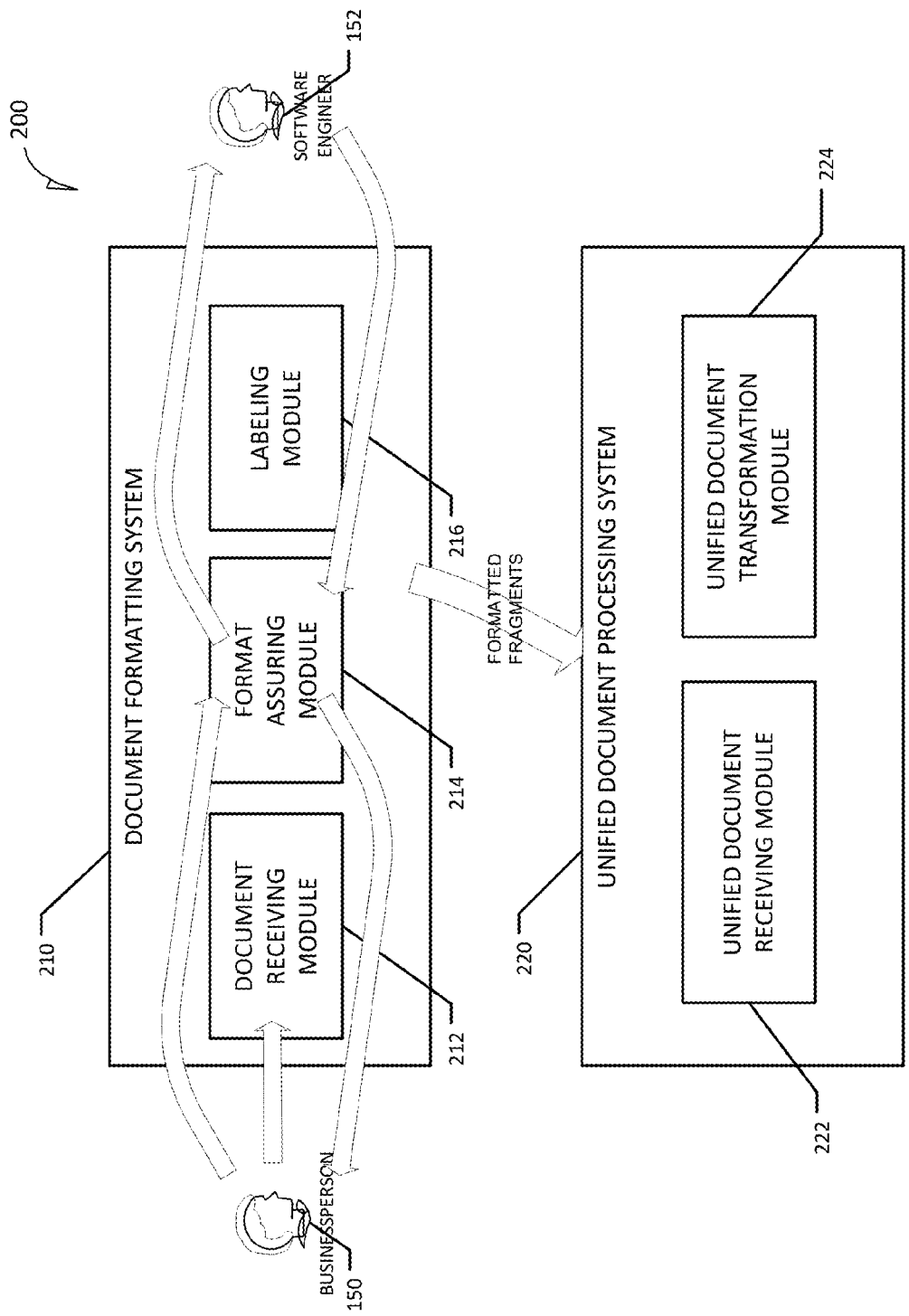
FIG. 2 is a block diagram showing a sample development environment within which systems and methods for improving software specifications and design using a unified document are implemented, in accordance with an example embodiment.

FIG. 2 is a block diagram showing a sample development environment 200 within which systems and methods for improving software specifications and design using a unified document can be implemented, in accordance with an example embodiment. As shown in FIG. 2, the sample development environment 200 can comprise a document formatting system 210 and a unified document processing system 220. The unified document processing system can process a unified document described in more detail below with reference to FIG. 3. Various stakeholders described above with reference to FIG. 1 can interact with the unified document. A document receiving module of the document formatting system 210 can receive, from the businessperson 150, a document including requirements in the language that is natural to the businessperson 150. The requirements can include a plurality of parts, which can include a data outline such as information, or process of interest, and an example of functionality. The requirements can further include a set of simple affirmative or negative assertion statements, which can be made with respect to a description text. The negative assertion statements can include combinations in disjunctive or conditional forms.

Optionally, the businessperson 150 may forward a less detailed and less finely dissected statement of requirements to the document receiving module 212 which the software engineer 152 may propose to dissect in the manner described herein and then forward the dissected requirements to the businessperson 150 for approval and/or revision. These iterations may proceed until both businessperson 150 and software engineer 152 understand the requirements.

This approach can result in a document having a plurality of labeled text fragments that can be categorized as explanatory or introductory narrative text, outlines of subject matter, examples, and assertion statements. The software engineer can edit the document and translate the text fragments into engineering specifications. For example the outlines of the subject matter can be translated into appropriate models for information (e.g. UML class diagram, E-R-diagram, XML Schema, etc.) or for processes (e.g., flow charts, Petri Nets, UML activity diagrams, etc.), and application programming interface (API) specifications such as class signatures (C++ or Java interfaces). The examples can be translated into formal data structure instances and sequence scripts (test scripts). The assertion statements can be translated into formal assertions using expression language that is executable or compiled to be executable once the fragments are extracted from the document and arranged into appropriate code files.

During creation of the fragments, the engineer can revise the structure and flow chart of the presentation of the business requirements, or the engineer may discover cases in which the business requirements should be described in more detail. In either case, the process can iterate until the businessperson 150 and the software engineer 152 agree.

The document formatted according to the steps described herein can be received by a unified document receiving module 222 of the unified document processing system 220. A unified document transformation module 224 of the unified document processing system 220 receives the document as an input and automatically produces an output. The output can include a plurality of documents, document views, source code files, and other data applicable to further processing. Thus, the plurality of documents can include source code files appropriate for execution or compilation into executable code.

The plurality of documents can further include a shortened document, which only contains some of the text fragments while hiding others. In an example, only the business requirements statements are shared with other partially competing stakeholders, hiding the design and implementation details or hiding details which might confuse the reader of such a generated derived document. The plurality of documents can further include: test case data instances in the form of messages or other data structures which can be presented to the software for processing of end-user documentation; and/or installation and configuration guides or other product reference material combining text fragments which were appropriately labeled to be included in these documents.

The unified document transformation module 224 may combine text fragments of the same kind across the whole document possibly rearranging the sequence or replicating material and/or re-using a fragment multiple times in different appropriate locations in the output documents (e.g., code fragments used as macros, sub-routines, method calls, and object-oriented sub-classing).

The unified document transformation module 224 may distribute text fragments of the same kind into multiple different output documents, document views, source code or data, as appropriate. For example, introductory material or examples may be included in several documents; business requirement assertions may be included also in source code as comments.

The unified document transformation module 224 may transform text fragments of one kind for inclusion in output of a different kind. For example, it may transform the natural language assertions from the business requirement fragments into error messages that may use different verb forms (e.g., translating "the input has an identifier" to "the input must have an identifier"). Another transformation creates data schemas from example data to ensure that no case is permitted that is not described in the document by an example.

Figure 3:
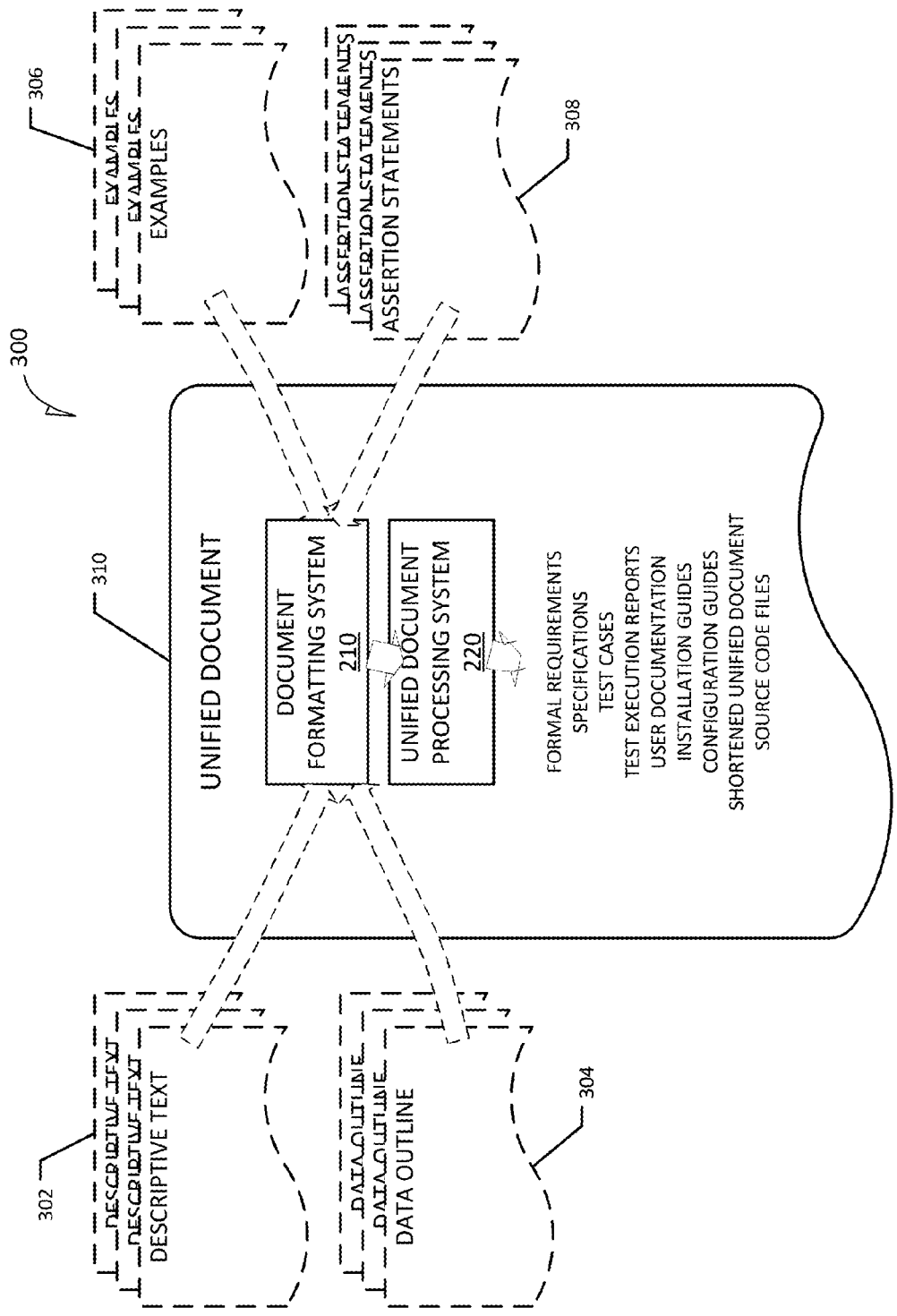
FIG. 3 is a block diagram showing a sample unified document, in accordance with an example embodiment.

FIG. 3 is a block diagram showing a sample unified document 310, in accordance with an example embodiment. As mentioned above, the businessperson 150 can state the requirements in the language that is natural to him/her. The requirements can include a plurality of parts, which can include a data outline 304 such as information, or process of interest and an example 306 of functionality. The requirements can further include a set of simple affirmative or negative assertion statements 308, which can be made with respect to a description text 302. The negative assertion statements 308 can include combinations in disjunctive or conditional forms.

The unified document processing method can result in a text processor document, authored by a plurality of stakeholders such as a businessperson, an analysis, a system designer and others. The text processor document can combine fragments of the business requirement specification and engineering specification using a plurality of named formatting styles and semi-formal keywords to label the fragments and differentiate them from one another. The plurality of named formatting styles and semi-formal keywords can cover business requirements, engineering specifications, source code, test cases, user guide considerations and/or any other representation of interest. The unified document processing method can enable filtering, arranging, and transforming of the text fragments to generate derived documents, document views, source code, test case data and test scripts or any other representation of interest.

Figure 4:
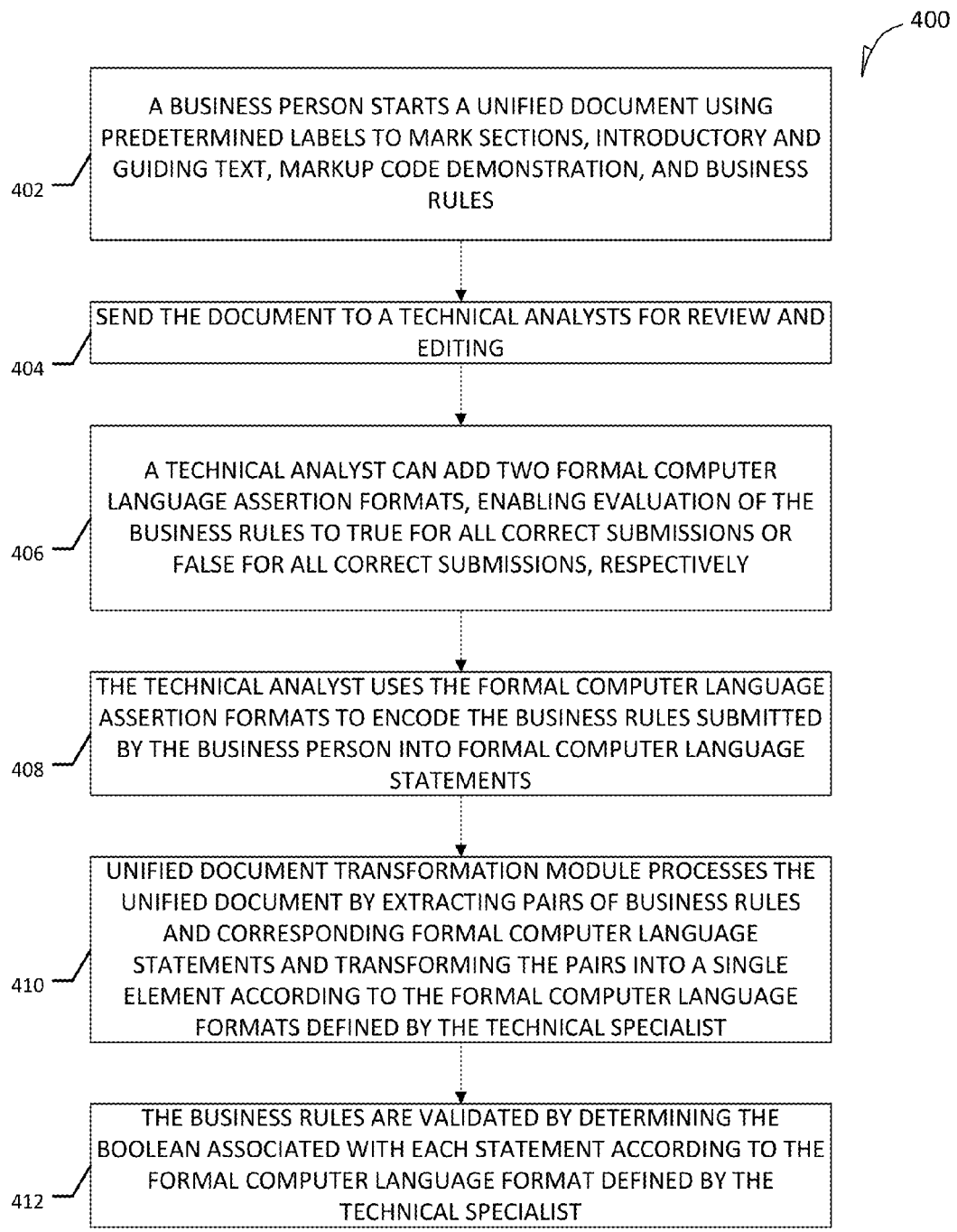
FIG. 4 is a flow chart showing a sample method for using a unified document, in accordance with an example embodiment.

FIG. 4 is a flow chart showing a sample method 400 for using a unified document, in accordance with an example embodiment. The method 400 may be performed by processing logic that comprises hardware (e.g., dedicated logic, programmable logic, microcode, etc.). In one example embodiment, the processing logic resides at the document formatting system 210 illustrated in FIG. 2.

To illustrate the invention's end-to-end capabilities, an example is demonstrated in the following paragraphs. Let us assume, for the purpose of the present example, that there exists a requirement to specify a regulatory data submission processing system (e.g., for an electronic tax return, an adverse drug reaction report, or a clinical trial report) which in this example uses an XML based information representation standard. The purpose of the document is to specify the regulatory mandate and background, provide introduction and guidance to implementers, specify example data fragments to detail how certain pieces of information are to be submitted, and to provide detailed validation and processing rules.

The method 400 can commence at operation 402 with a business person at the regulatory agency, starting a unified document, in this example, using common Microsoft Word text processing software. The business person may use the following named formatting styles made available in a document template, including (1) various section heading styles to mark sections (2) "Explanation" style for general introductory and guiding text explaining the subject matter, (3) "XML" for an piece of example XML code demonstration, (3) "BusinessRule" style for specific actionable/verifiable plain English statements about a data structure or system operation. At operation 404, the business person may circulate the document among other business specialists and technical analysts who can correct and refine the initial draft.

At operation 406, a technical analyst, IT specialist or software engineer can review the document, and add text using the following named formatting styles, also defined in the document template: (4) "AssertionAssert" for formal language, in this example, XPath, which when evaluated on a data submission, must evaluate to an effective Boolean value of "true" for all correct data submissions, (5) "AssertionReport" like AssertionAssert, but must evaluate to "false" for all correct data submissions (the two modes of assertions, assert and report, mirror similar concepts in the Schematron specification, which will be one of the output documents of the unified document.

At operation 408, the technical analyst, IT specialist or software engineer places each of said "AssertionAssert" and "AssertionReport" text fragments (summarily referred to as "Assertion fragments") directly subsequent to each of the "BusinessRule" statements. Thus, each Assertion fragment encodes exactly one Business Rule, the "BusinessRule" fragment being a plain English notation and the "Assertion" fragment being a computer executable notation of the same conceptual business rule.

When the unified document is processed by the unified document transformation module at operation 410, said module extracts each pair of BusinessRule and Assertion fragment by enclosing them in a single data structure and eventually placing both into the appropriate format of, for example, a Schematron document. In a Schematron document, each Assertion fragment is results in an Schematron XML element called "assert" and "report" respectively, with the XPath expression in an XML attribute called "test" and the plain English text in the text node enclosed in said XML element.

At operation 412, Schematron validation processors process the document and a data submission to validate if the submission is correct by determining the effective Boolean value of each XPath statement. If said Boolean value is "true" for report assertions or "false" for assert assertions, then an error is reported using the plain English text originating from the BusinessRule fragment in the unified document.

In order for the plain English BusinessRule fragment to be displayed appropriately as an error message, the message must be in imperative or subjunctive mood, e.g., it must say, "There must be an id element with a universally unique identifier (UUID)". Furthermore, the imperative or subjunctive mood in specification documents is often divided up into "must", "should", and "may" and these auxiliary verbs can be used to specify the mood ("must mood" vs. "may mood"). However, the business rule may have been stated in indicative mood, in this example "There is an id element with a universally unique identifier (UUID)". Thus, a natural language processing sub-module (called "NLP sub-module") of the transformation module can transform the mood of natural language statements from indicative to imperative.

The NLP sub-module in this example works using a small lexicon of verbs and their forms, which are used by the business persons and analysts to write the BusinessRule fragments. Such verbs may include the verbs with the stems "be" (as copula, "A is B"), "exist" ("there is A"), "have" ("A has B"), "contain", "come", "begin", "include", "agree", and "match". The verb forms recognized for each stem are enumerated in the lexicon by grammatical feature including number (singular vs. plural), mood (indicative vs. imperative), and sense (affirmative vs. negative) and the lexicon contains for each combination of verb stem with said grammatical features the correct English verb form. For example, for the stem "be" the singular indicative affirmative form is "is", the plural indicative affirmative form is "are", and the singular imperative affirmative form is "must be".

The lexicon further specifies sentence frames for each verb, to indicate the position of the auxiliary verb and the negation word in relation with subject and object (e.g., "there must be an identifier" vs. "the identifier must not be empty").

Thus the a sub-component of the NLP sub-module can recognize the mood and form and subject and object, by matching an actual statement with a lexicon entry, and then look up another lexicon entry with the same verb stem and number, but in a different mood or negation-sense. Using said other lexicon entry and placing subject and object in the appropriate positions in the sentence frame for this lexicon entry, the NLP sub-module can generate correctly formulated English sentences in different mood form, negation sense, as required for the purpose.

Besides the purpose of creating English statements in "must" mood from indicative ones, the NLP sub-module may be employed for other purposes. For example, if the business person chooses to employ specific "must" "shall" and "may" moods in the BusinessRule text, the NLP sub-module can recognizes these moods and transform the statements into indicative form to generate a checklist for use by a human tester or reviewer, or to generate explanatory error messages which explain the condition of the erroneous submission. For example, the error message may be "There must be a unique id", and an explanation message may "There is no unique id in this submission, please ensure that there is a unique id."

Thus, the function of the NLP sub-module has been specified in detail to illustrate that the unified document system can contain considerable non-trivial artificial intelligence in order to reduce the amount of manually created work products derived from the business specification. This allows the business people to phrase the rules one way for expressing requirements, and the unified document system to create error messages or explanation messages matching the business people's specification without requiring software engineers to manually update their data processing systems. Similar intelligent function can be provided, and are described further in this specification as examples making the same point.

When example XML data structures are to be written in a specification document, there is often too much redundancy (such as for closing tags) so that it is hard for humans to see exactly which point an example is trying to make. In addition, when a valid XML example is specified in full, it is often too long to allow the reader to see only the specific point of the example. Hence, writers of XML specification for human readers often employ abbreviations, ellipsis or incomplete XML snippets (without closing tags) which are not well-formed and certainly not entirely valid. However, these XML snippets still contain valuable information, which can be used by another sub-module of the transformation module of the unified document system. The following paragraphs refer to a common XML snippet example given as follows:

```
<document>
    <author>
        <assignedEntity>
    <representedOrganization>
        <id extension="100000001" root="1.3.6.1.4.1.519.1"/>
        <name>Acme drug company</name>
        <contactParty>
```

The XML sub-module can complete the unfinished XML examples by automatically inserting closing tags, which close the most recently opened unclosed element. For example, if the XML snippet example above, the XML sub-module would append a </contactParty> closing tag, then </representedOrganization>, followed by </assignedEntity>, </author> and </document>. Once the XML sub-module has completed the text into such a well-formed representation, the XML sub-module may parse the XML snippet to obtain an actual XML data structure for further processing.

One use of such XML data structure is to specify XML elements, which are allowed. For example, there is a need in many implementation guides and business rule specifications for regulatory data submission systems to detect and reject submissions, which specify data that the receiving system cannot validate, understand and process. Such specifications would contain the English rule "There are no XML elements or attributes besides the ones detailed in this document." However, what is detailed in the specification document is found only in these XML snippets. Once the XML sub-module has such XML snippets completed and parsed as XML structures, it can transform these XML structures into XSLT transform "match patterns", which will match allowable data structured in the submission, and consequently a submission validation system built from the unified document, is able to detect any data structures that are not so matched by the patterns generated from the XML snippets.

A match pattern may be generated from an XML snippet as follows: For each XML element or XML attribute nested inside the XML snippet, create a match pattern path by prepending a slash "/" to the name of the element (and "/@" to the name of an attribute), and then recursively do the same for the parent element. Thus in the above example, match patterns generated include document/author/assignedEntity/representedOrganization/id/@extension and document/author/assignedEntity/representedOrganization/id/@root, also document/author/assignedEntity/representedOrganization/contactParty, and finally all parent paths: document/author/assignedEntity/representedOrganization, document/author/assignedEntity, document/author, and document.

The XML snippet need not be rooted in the top-level XML element, but may begin with any context element which indicates the context sufficiently. For example, given the specification of an allowable placement of the <contactParty> element in the previous XML snippet, another XML snippet may specify only <contactParty> and its child XML elements and attributes without having to repeat the entire path leading to it from the document root. This allows XML snippets to be specific to the point of the example, and allow the overall unified document to be structured in properly distinct subjects, which can be understood by humans. In this example, one section in the unified document may discuss the representation of "document and author" elements, another section may detail how "organizations" are defined (e.g. <representedOrganization>), yet another may specify the details <contactParty> elements.

The template used for authoring unified documents may contain a large number of different named formatting styles for other purposes. For example, even such simple elements as <name> and <id> elements, may require business rules to validate formatting and length of such data. These rules too should be stated only once in a unified document to reduce redundancy and reduce the risk of inconsistency and errors. In this example, it is possible to capture business rules with "AssertionContext" declaration fragments, which apply a name to the business rules for <id> and make these same rules available in other contexts.

The "AssertionContext" element is also used to allow the flow of the unified document to be specified in the order which is most sensible from the perspective of the document author and its human readers, while still allow the transformation module to put the fragments together generating the various output artifacts, such as, in this example, a Schematron document. For this the AssertionContext elements may contain formal language such as "BEGIN id-general APPLIES TO id" to begin a set of BusinessRule fragments each followed by its Assertion fragment, which are then together named "id-general" and which are thus declared to apply to any element named "id". Such named set of business rules is terminated by an AssertionContext fragment "END id-general" so that all BusinessRule and Assertion fragments between the AssertionContext "BEGIN . . . " and the AssertionContext "END . . . " belong to that named business rule set.

Instead of a single named formatting style called "AssertionContext" in which the technical author places formal language statements such as "BEGIN . . . APPLIES TO . . . " and "END . . . ", the document template may have styles called "AssertonContextBegin" and "AssertionContextEnd", etc. This example illustrates that the unified document may not only use named formatting styles but also formal language fragments and other textual tags (see below) to specify how the transformation module shall transform and assemble a plurality of output artifacts.

Said AssertionContext fragment correspond to "rule" elements in the Schematron language. However, the "AssertionContext" elements when controlling the transformation module can be more powerful. For example, another AssertionContext fragment may invoke the business rules specific to an id element that occurs under a document element by "BEGIN document-id APPLIES TO id UNDER document-general". In this example, document-id is the name of the new set of business rules, "id" is the XML element name, and "document-general" is the name of another rule set, which describes documents whose AssertionContext may have been specified as "BEGIN document-general APPLIES TO document". Now, the transformation module can infer that document-id UNDER document-general applies to elements matching the XSLT match pattern "document/id", and thus the transformation module can create a Schematron rule element <rule context="/document/id"> containing the business rules as Schematron <assert> or <report> elements.

Continuing with this same example, another AssertionContext fragment may be "REUSE id-general UNDER document-general". This will include the business rules from the business rule set previously declared as "id-general" explicitly into the business rule set declared here as "document-general". Thus Schematron rule context "document/id" would be created by appending the APPLIES TO element "document" of the business rule set "document-general" with the APPLIES TO element "id" of the business rule set "id-general".

Thus AssertionContexts have been defined which allow document content to be reused in various places. The ability to refer to named business rule sets is analogous to how writers of human specifications refer to business rules, e.g., by saying "The general rules for ids specified above also apply to organization ids". Such plain English business rule reference would be encoded by a "REUSE id-general UNDER organization" AssertionContext statement.

Once the unified document has been completed by the IT specialists and software engineers completing the Assertion fragments under the BusinessRule fragments, and by framing the BusinessRules and Assertions in the appropriate AssertionContexts, the unified document can be processed by the transformation module to generate a Schematron document, as well as a human readable implementation guide with business rules, and also an abbreviated check-list document containing only the business rules, which can be used by human reviewers.

The transformation module may be specifically capable of processing the binary proprietary Microsoft Word document, or, as in this example, simply use document as saved in an XML format supported by that Word Processor software. For this, a pre-transformation sub-module of the transformation module may filter unnecessary elements found in the proprietary word-processor XML format to simplify the task of the main transformation module. Such pre-transformation may also include the proper nesting of sections inside sub-sections and the afore-mentioned pairing of BusinessRules and Assertion fragments as well as the organization of business rule sets defined by AssertionContext fragments.

The example specification of the a regulatory data submission and processing system using a unified document have illustrated that such unified document can fulfill the purpose of a human readable implementation guide but also a formal XML data schema specification, from which the transformation module can generate Schematron specifications. This principle can be applied to other XML standards, such as W3C XML Schemas that can be derived from the XML snippets. Non-XML data structures may also be specified provided that the transformation module generates the required validation expressions (e.g., formal language parser definitions from BNF expressions) as required.

In addition, business rules are not limited to the Schematron expressions that operate only on a single document. Many BusinessRules must refer to a state of the overall data processing system with a database. For example, one business rule might be "An organization has been previously registered by the organization registration system" or "the organization id is a valid id in the Dun and Bradstreet DUNS registry and the organization address must agree with this registry". Such rules thus require validation to access the specific data processing system's databases or other registries. In this example, such calls to other services may be encapsulated in user-defined XSLT functions, which are included into the context in which the Schematron validation rules are being evaluated. Thus, any external system can be included in the Assertion fragment expressions.

The above example has used named formatting styles to mark the different text fragments. These formatting styles will often have visual distinct features. For example, plain English business rules may render like an itemized numbered list, XML fragments may render in shaded and framed boxes using fixed-width font, AssertionAssert fragments may be in green shaded boxes and AssertionReport fragments in red shaded boxes. In addition, the format of the styles for the formal fragments including Assertion fragments and AssertionContext fragments may be defined to use "hidden" font, which makes this content entirely invisible in printed copies of the unified documents. This can facilitate human readability, as many business analysts would not appreciate having the document be cluttered with formal computer language content.

Once the unified document has been transformed in the various artifacts and these artifacts are used to operate a production data processing system the unified document may be used to continually configure and maintain the data processing system. For example, the business people may decide that certain business rules should be temporarily disabled. Such need may arise when a new data processing system is put in place, which has business rules that are infeasible to be enforced in the beginning. In this example, the requirement for all organization to be registered may not be practically enforceable in the first year of the system's operation. In this case, the business people who own the system or their IT support staff can easily edit the unified document to disable some business rules. For example, the document template may contain the named styles "DisabledAssertionAssert" and "DisabledAssertionReport" which may be visually represented by strike-through font decoration. While still visibly part of the unified document (notwithstanding the ability to hide such formal language fragments using the "hidden" style feature as explained above), the transformation module would not recognize these disabled fragments as Assertion fragments, and hence does not include these validation processes in the resulting Schematron artifact, while still showing the plain English statement as a reminder to implementers to follow the business rules where feasible.

While in the above example named formatting styles and formal language fragments have been illustrated as markers used to distinguish fragments in the unified document and to control the transformation module in its creation of derived artifacts, other mechanisms may be used. For example, text tags may be added to formal Assertion fragments when syntactically clearly distinct from the formal language used in these fragments. In this example, the tag "#overridable" may be added to the beginning of an Assertion fragment to add an extension element into the Schematron artifact, which in turn can be used by the data processing system to allow an end-user to decide to manually override certain business rules when an exceptional need arises.

Similarly, tags may be used to indicate different modes of the business rule validation, analogously to "phases" known in the Schematron standard.

This example system may contain not only business rules and example XML fragments but may also contain fragments in a style "TestCaseCorrect" and "TestCaseIncorrect" with XML fragments which the transformation module may extract and assemble into test cases to check the proper functioning of the business rule validation procedures. Some of such test cases may be listed in human readable documents resulting from the unified documents, and many test cases would remain hidden to the human reader but available to the automated test case execution module of the data processing system. Such document fragments may, for example, result in JUnit test cases.

Other fragments may contain programming language code fragments, using languages as Java or C or XSLT, whereby the transformation module using similar controls as the illustrated AssertionContext fragments will assemble the programming language fragments accordingly to provide all or some of the resulting modules of the data processing system specified in the unified document.

Thus the systems and methods for improving software specifications and design using a unified document can combine requirements, design, and coding artifacts in a single master-document. This master document remains a "living document" throughout the life of the system in which one thing is stated only once and where requirements, examples, design, coding, testing, and user documentation are described together in one location. Therefore, any update in the requirement can be responded to in an update of the design and coding; any change in the design or coding can be responded to with updated user documentation, eliminating the difficulties with maintaining separate documents.

Figure 5:
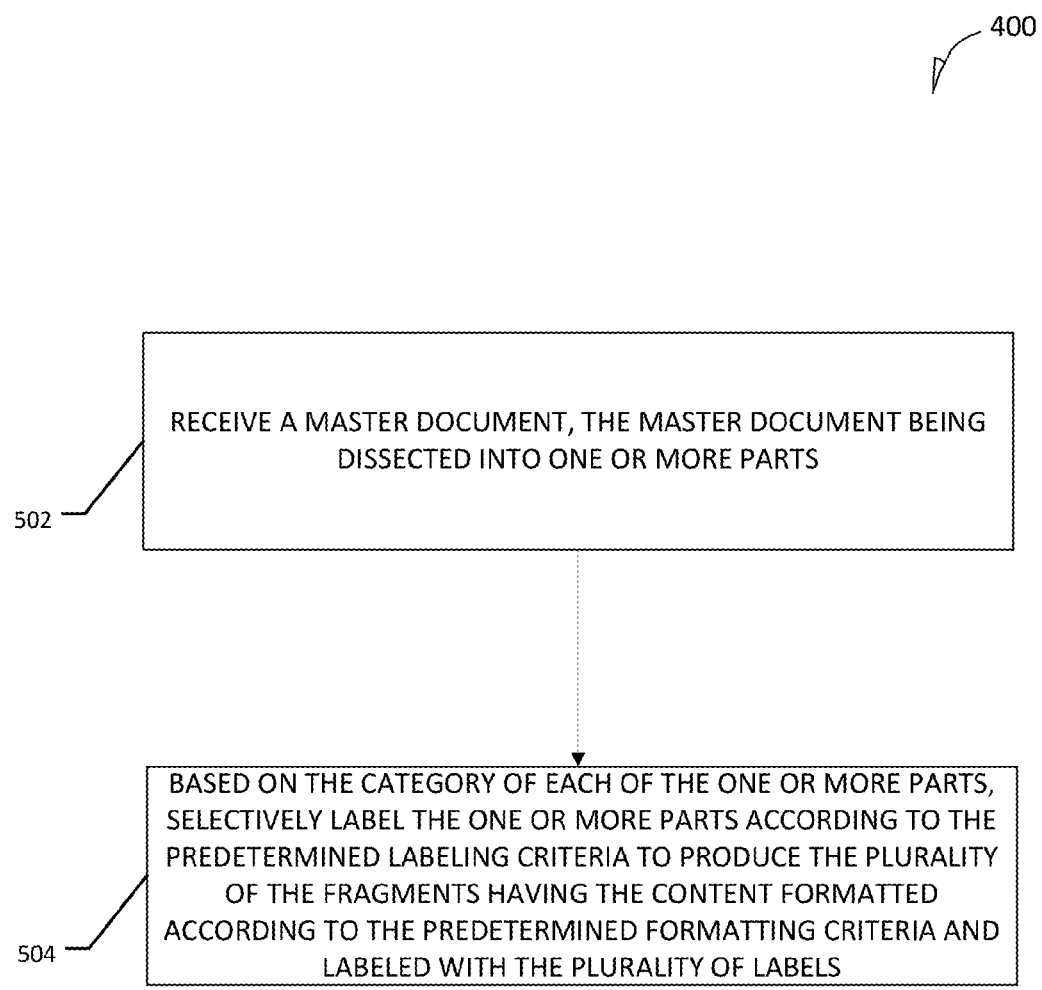
FIG. 5 is a flow chart showing a sample method for formatting a unified document, in accordance with an example embodiment.

FIG. 5 is a flow chart showing a sample method 500 for formatting a unified document, in accordance with an example embodiment. The method 500 may be performed by processing logic that comprises hardware (e.g., dedicated logic, programmable logic, microcode, etc.). In one example embodiment, the processing logic resides at the document formatting system 210 illustrated in FIG. 2.

The method 500 can commence at operation 502 with the document receiving module 212 of the document formatting system 210 receiving a master document, the master document being dissected into one or more parts. The format assuring module 214 of the document formatting system 210 can automatically assure that each of the one or more parts is formatted according to a category specified in the predetermined formatting criteria. At operation 504, the labeling module 216 of the document formatting system 210 selectively label the one or more parts according to the predetermined labeling criteria, based on the category of each of the one or more parts, to produce the plurality of the fragments having the content formatted according to the predetermined formatting criteria and labeled with the plurality of labels. The plurality of labels can include a description, an outline of data, an example, and an assertion statement.

Figure 6:
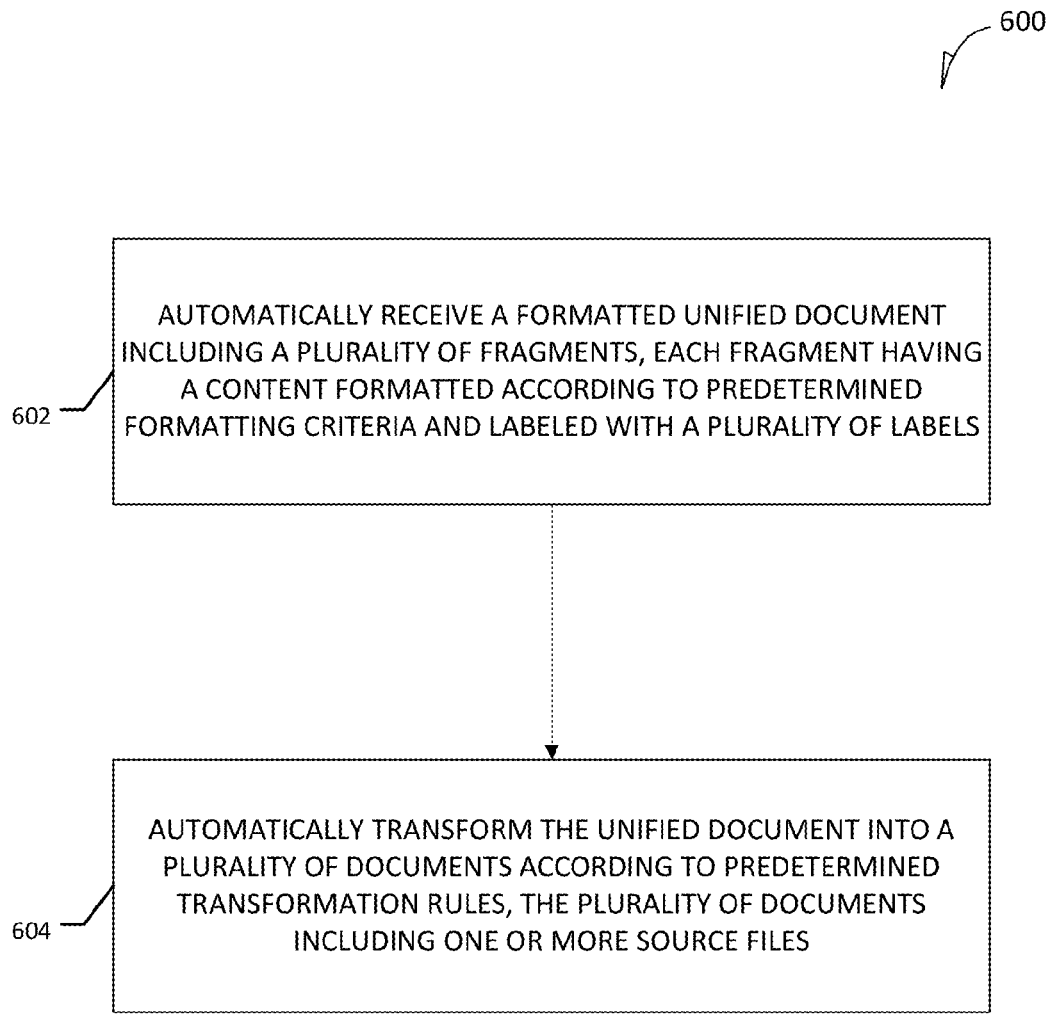
FIG. 6 is a flow chart showing a sample method for processing a unified document, in accordance with an example embodiment.

FIG. 6 is a flow chart showing a sample method 600 for processing a unified document, in accordance with an example embodiment. The method 600 may be performed by processing logic that comprises hardware (e.g., dedicated logic, programmable logic, microcode, etc.). In one example embodiment, the processing logic resides at the unified document processing system 220 illustrated in FIG. 2.

The method 600 can commence at operation 602 with the unified document receiving module of the unified document processing system 220 automatically receiving a formatted unified document, the unified document including a plurality of fragments with each fragment of the plurality of the fragments having a content formatted according to predetermined formatting criteria and labeled with a plurality of labels. The method 600 can continue at operation 604 with the unified document transformation module 224 automatically transforming the unified document 310 into a plurality of documents according to predetermined transformation rules, the plurality of documents including one or more source code files.

The source code files produced at operation 604 can be immediately executable or executable after being compiled into an executable code. The plurality of documents can further include a test document, an installation document, a configuration document, a user document, and an edited version of the unified document, and the edited version being visible to a user with permission privileges associated with the edited version. The test document can include one or more of executable test cases.

Figure 7:
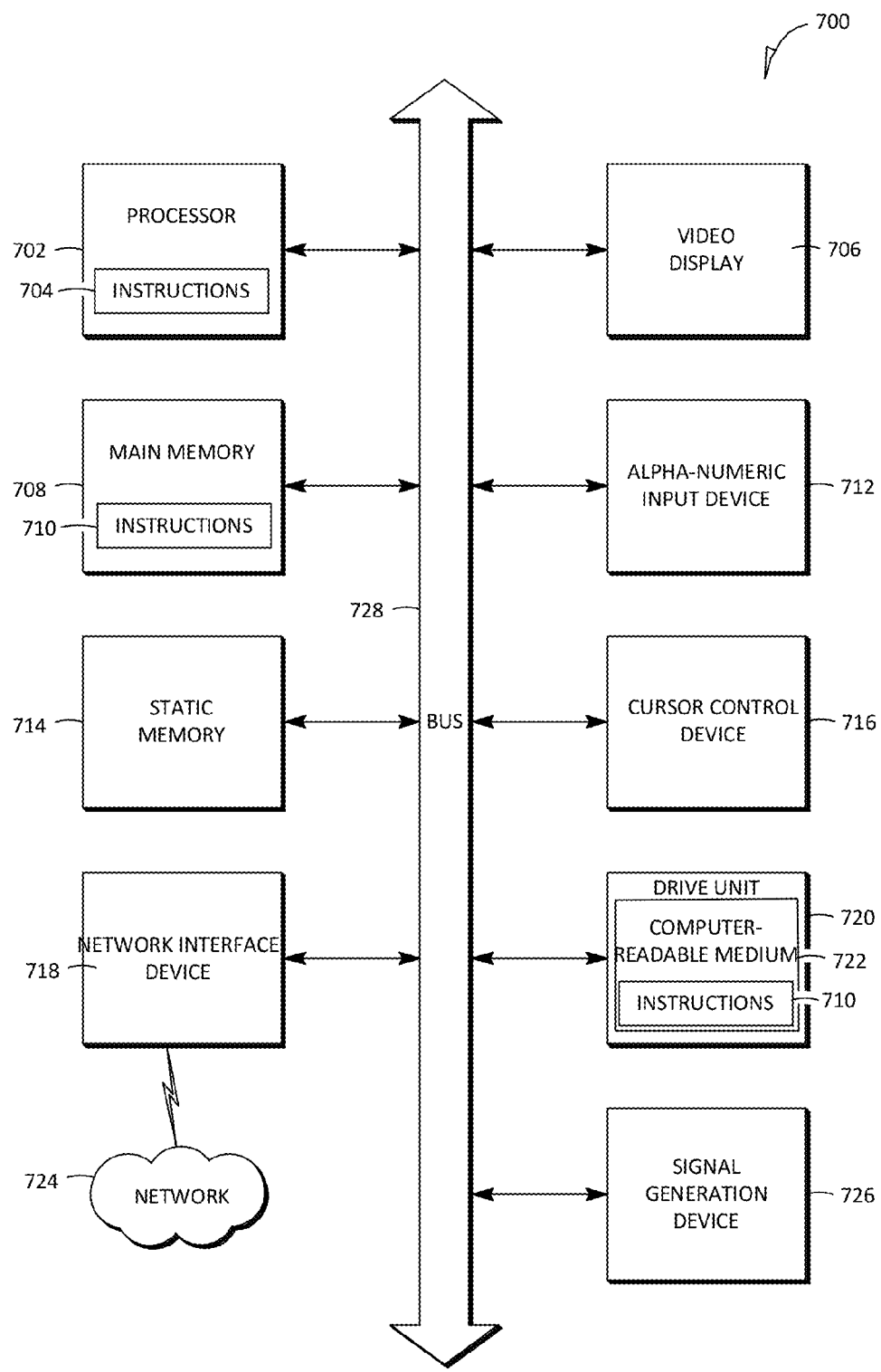
FIG. 7 is a diagrammatic representation of an example machine in the form of a computer system within which a set of instructions for causing the machine to perform any one or more of the methodologies discussed herein is executed.

FIG. 7 is a diagrammatic representation of an example machine in the form of a computer system 700, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor or multiple processors 702 (e.g., a central processing unit (CPU), a graphics processing unit (GPU), or both), and a main memory 708 and static memory 714, which communicate with each other via a bus 728. The computer system 700 may further include a video display unit 706 (e.g., a liquid crystal display (LCD)). The computer system 700 may also include an alphanumeric input device 712 (e.g., a keyboard), a cursor control device 716 (e.g., a mouse), a voice recognition or biometric verification unit, a disk drive unit 720, a signal generation device 726 (e.g., a speaker) and a network interface device 718. The computer system 600 may further include a data encryption module (not shown) to encrypt data.

The disk drive unit 720 includes a computer-readable medium 722 on which is stored one or more sets of instructions and data structures (e.g., instructions 710) embodying or utilizing any one or more of the methodologies or functions described herein. The instructions 710 may also reside, completely or at least partially, within the main memory 708 and/or within the processors 702 during execution thereof by the computer system 700. The main memory 708 and the processors 702 may also constitute machine-readable media.

The instructions 710 may further be transmitted or received over a network 724 via the network interface device 718 utilizing any one of a number of well-known transfer protocols (e.g., Hyper Text Transfer Protocol (HTTP)).

While the computer-readable medium 722 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

Thus, methods and systems for improving software specifications and design using a unified document have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What I claim is:

1. A computer-implemented method for improving software specifications and design using a unified document, the method comprising:
    receiving a master document, the master document being dissected into one or more parts;
    automatically assuring, using a non-Extensible Markup Language (XML) schema, that each of the one or more parts is formatted according to a category specified in predetermined formatting criteria;
    based on the category of each of the one or more parts, selectively labeling the one or more parts according to predetermined labeling criteria to produce a plurality of fragments having content formatted according to the predetermined formatting criteria and labeled with a plurality of labels;
    based on formatted content, automatically receiving a formatted unified document, the unified document including the plurality of fragments, each fragment of the plurality of the fragments having the content formatted according to the predetermined formatting criteria; and
    automatically transforming the unified document into a plurality of documents according to predetermined transformation rules, the plurality of documents including one or more source code files.

2. The computer-implemented method of claim 1, wherein the unified document is originated by a business person using predetermined labels to mark sections of one or more of the following: sections of the unified document, introductory and guiding text, markup language, and business rule statements.

3. The computer-implemented method of claim 2, wherein a technical analyst adds first text related to first computer language assertion format and second text related to second computer language assertion format to the unified document, the first computer assertion format to enable evaluation of the business rule statements to true for all correct statements and the second computer assertion format to enable evaluation of the business rules statements to false for all correct statements.

4. The computer-implemented method of claim 3, wherein the technical analyst adds computer language assertions to encode the business rules statements submitted by the business person into computer language statements.

5. The computer-implemented method of claim 4, further comprising automatically extracting the business rules statements and/or the computer language statements and transforming each pair into a single element according to the computer language formats defined by the technical specialist.

6. The computer-implemented method of claim 5, further comprising automatically validating the business rules by determining a Boolean associated with each statement according to the formal language format defined by the technical specialist.

7. The computer-implemented method of claim 5, further comprising inflecting the text of the unified document using Natural Language Processing (NPL) to change the grammar of the text from declarative mood to imperative mood, the imperative mood becoming errors utilized during the validating of the business rules.

8. The computer-implemented method of claim 5, wherein an executable file of Schematron contains a query language for selected erroneous nodes from XML data submissions enabling a declarative language to make an executable validator to validate the business rules.

9. The computer-implemented method of claim 5, wherein the validator processes the unified document and generates errors in a natural language.

10. The computer-implemented method of claim 1, wherein the one or more source code files include one or more of the following: a Schematron document, an XSLT transform, a Java program, a C++ program, a Groovy file, and a Javascript file.

11. The computer-implemented method of claim 1, wherein the plurality of documents further includes one or more of the following: a test document, an installation document, a configuration document, a user document, and/or an edited version of the unified document, the edited version being visible to a user with permission privileges associated with the edited version.

12. The computer-implemented method of claim 11, wherein the test document includes one or more of executable test cases.

13. The computer-implemented method of claim 1, wherein the predetermined transformation rules include combining the plurality of the fragments into the plurality of documents.

14. The computer-implemented method of claim 1, wherein each of the plurality of labels includes one or more of the following: a description, an outline of data, an example, and an assertion statement.

15. The computer-implemented method of claim 14, wherein the predetermined transformation rules include one or more of the following: transforming the description into a data model, transforming the example into a test case, and transforming the assertion statement into a formal assertion of an expression language.

16. A computer-implemented system for improving software specifications and design using a unified document, the system comprising a processor configured to:
   automatically receive a formatted unified document, wherein formatting is based on:
      receiving a master document, the master document being dissected into one or more parts;
      automatically assuring, using a non-XML schema, that each of the one or more parts is formatted according to a category specified in predetermined formatting criteria;
      based on the category of each of the one or more parts, selectively labeling the one or more parts according to predetermined labeling criteria to produce a plurality of fragments having content formatted according to the predetermined formatting criteria and labeled with a plurality of labels;
   the unified document including the plurality of fragments, each fragment of the plurality of the fragments having the content formatted according to the predetermined formatting criteria; and
   automatically transform the unified document into a plurality of documents according to predetermined transformation rules, the plurality of documents including one or more source code files.

17. The system of claim 16, wherein the plurality of documents further includes one or more of the following: a test document, an installation document, a configuration document, a user document, and an edited version of the unified document, the edited version being visible to a user with permission privileges associated with the edited version.

18. A computer-readable medium comprising instructions for improving software specifications and design using a unified document, which when implemented by one or more processors, performs the following operations:
   automatically receive a formatted unified document, wherein formatting is based on:
      receiving a master document, the master document being dissected into one or more parts;
      automatically assuring, using a non-XML schema, that each of the one or more parts is formatted according to a category specified in predetermined formatting criteria;
      based on the category of each of the one or more parts, selectively labeling the one or more parts according to predetermined labeling criteria to produce a plurality of fragments having content formatted according to the predetermined formatting criteria and labeled with a plurality of labels;
   the unified document including the plurality of fragments, each fragment of the plurality of the fragments having the content formatted according to the predetermined formatting criteria; and
   automatically transform the unified document into a plurality of documents according to predetermined transformation rules, the plurality of documents including one or more source code files.

\* \* \* \* \*